May 28, 1963 — A. W. WOLVEN — 3,091,302

WATER-KETTLE

Filed Feb. 2, 1959 — 2 Sheets-Sheet 1

INVENTOR.
ALBERT W. WOLVEN
BY
Marshall, Wilson, Click & Yeesting.
ATTORNEYS

May 28, 1963  A. W. WOLVEN  3,091,302
WATER-KETTLE
Filed Feb. 2, 1959  2 Sheets-Sheet 2
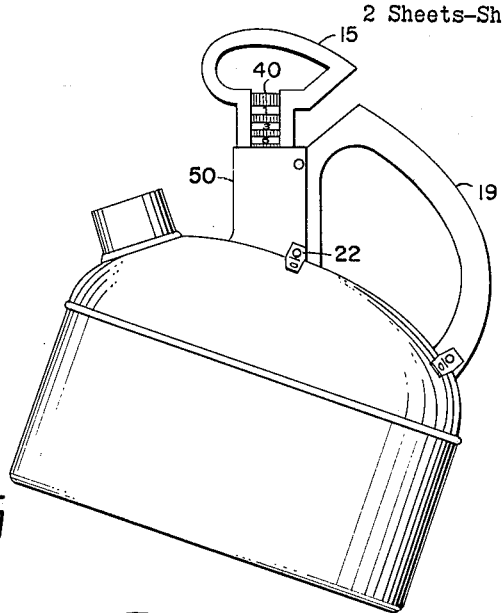
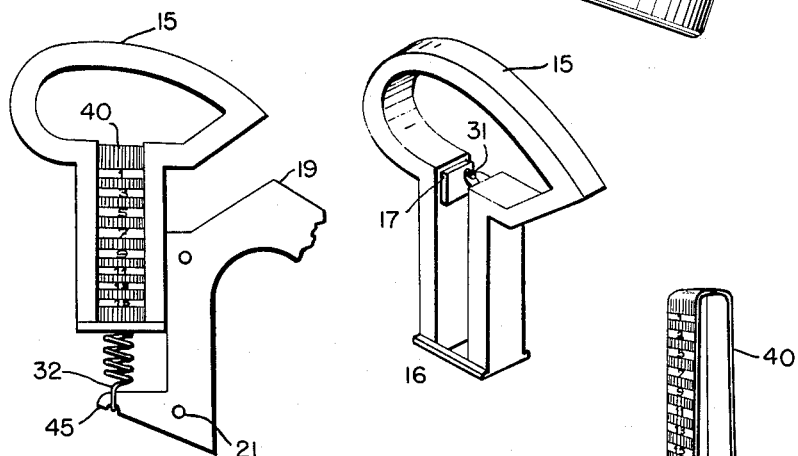
*INVENTOR.*
ALBERT W. WOLVEN
*BY*
Marshall, Wilson, Click & Yeasting
ATTORNEYS

United States Patent Office 3,091,302
Patented May 28, 1963

3,091,302
WATER-KETTLE
Albert W. Wolven, Eemsstraat 44 II,
Amsterdam Zuid 2, Netherlands
Filed Feb. 2, 1959, Ser. No. 790,684
1 Claim. (Cl. 177—149)

An object of the invention is to enable one to ascertain the quantity of water in a water-kettle being filled, so that it is possible to measure out a desired quantity of water.

It is known to use a handle hingedly connected to the kettle, the upper part of the handle being telescopically guided by a bent tube at the top of the kettle. When filling the kettle held by the hinged handle, the kettle turns, bringing the spout downwards. It is necessary to exert an increasing torsional force on the handle in order to keep the kettle in the proper position during filling. It therefore becomes more difficult to read the weight as at the same time a careful watch has to be kept on the position of the kettle.

The invention thus relates to a water-kettle, having a spring-balance comprising a guide fixed to the kettle guiding a telescoping handle by which the kettle is carried during filling, this second handle being provided with a graduated scale by which the weight of the charge can be read without occurrence of the above mentioned drawbacks.

According to the invention the spring-balance is positioned between the spout and the usual handle, in such a way that if the kettle is carried by the handle of the spring-balance, the kettle assumes a slanting position with the spout upwards, the housing of the spring-balance then being substantially vertical.

Embodiments of the invention will now be described with reference to the accompanying drawings in which:

FIG. 6 is a side-view of the kettle having been partly filled;

FIG. 7 shows the balance-handle connected with the normal handle, by means of the spring, the spring in stretched position;

FIG. 8 is a diagrammatic view of the balance-handle; and

FIG. 9 shows a metal strip provided with a graduated scale.

Construction

Figure 1:
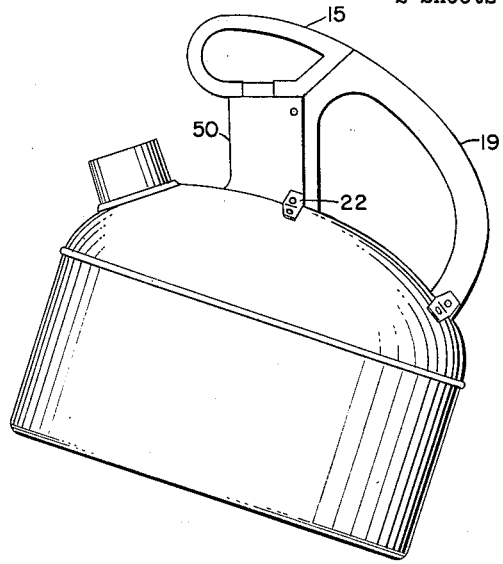
FIG. 1 is a side-view of an empty kettle in the slanting position which it assumes when carried by the handle of the spring-balance.
Figures 2, 3, 4, 5:
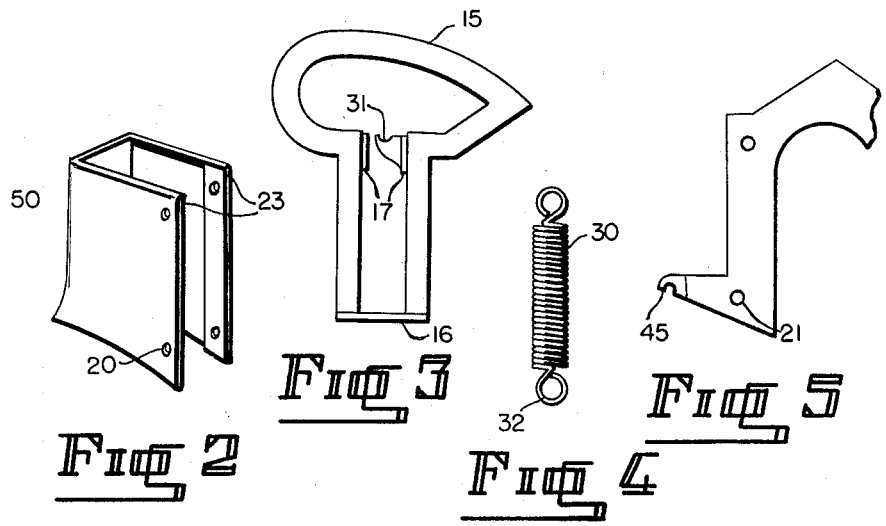
FIG. 2 is a diagrammatic view of the guide.
FIG. 3 is a side-view of the handle of the spring-balance.
FIG. 4 illustrates the spring.
FIG. 5 is a side-view of a part of the usual handle.

The spring 30 (FIG. 4) is hung up on the hook 31 of the balance-handle 15 (FIG. 3) then hanging clear with the lower end 32 between the two horizontal connections at the lower end 16 of the balance-handle 15 (FIGS. 3 and 8).

A metal strip 40 (FIG. 9) is slipped over the two square elevations 17 of the balance-handle 15 (FIGS. 3 and 8) slipped almost entirely downward, the bent edges 18 of the metal strip 40 (FIG. 9) are led between and around the horizontal connections 16 of the balance-handle 15 (FIG. 8) at which they catch of themselves.

FIG. 7 shows the ultimate position of the strip 40. The lower eye 32 of the spring 30, which can then still be seen, is attached to the hook 45 of the normal kettle-handle 19 protruding. FIG. 7 shows this position, with the balance-handle pulled-up somewhat here, stretching the spring. The guide 50 (FIG. 2) is then placed around the balance-handle 15 including strip 40 and spring 30 and is attached to the normal handle 19 by means of a screw or rivet 22 where the holes 20 and 21 of both parts meet. FIG. 6 makes it clear that the lower screw or rivet 22 serves at the same time to fix two of the four supports by which the normal handle is fixed to the body of the kettle.

Operation

When filling the kettle, carried by the balance-handle 15, the spring 30 of the balance will stretch as more water runs into the kettle, owing to the increasing weight. The kettle, the normal handle 19 and the guide 50 attached thereto, descend vertically, so the metal strip 40, which is attached to the balance-handle, becomes visible more and more (FIG. 6). The favorable position of the spout with respect to filling is maintained. If the last graduation-mark that has appeared to the eye is supposed to determine the charge, the latter can be read off with the aid of the figures shown on the strip. A desired quantity can be obtained by closing the tap at the moment that quantity is shown.

As shown in FIG. 2, the upper edges 23 of the guide are slightly bent inwards. If, the kettle, having arrived in the lowest position, continues to be filled with water, the balance-handle 15 cannot slip out of the guide 50, as the horizontal connections 16 of the guide handle 15 which stick out sidewards hit the upper edges 23 of the guide. Therefore, the spring cannot be overstretched.

Remarks

The benefit of a water-kettle described herein is amongst other things gas-saving and time-saving.

The graduation-marks on the diagram only serve as an example. They could be used in a country where the decimal system is used (e.g. the Netherlands). In that case, the graduation is expressed in decilitres, 1 decilitre being approximately equal to the capacity of an ordinary tea-cup. As the benefit of the kettle is strongly manifested when making tea or coffee, it is intended, in case of other measuring systems, to apply a graduation, which is either the exact equivalent or a close approximation.

The slanting position of the spring-balance has been accurately adapted to the position assumed by the kettle before and during filling, when carried by the balance-handle. This slanting position is necessary, amongst other things, to provide sufficient space for the normal grip and to meet the requirement that the distance between the spout and the graduated scale should be as small as possible, this being indispensable.

By pre-stretching the spring slightly, the weight of the kettle can be compensated.

What I claim is:

A weighing kettle, comprising; an enclosed container member having a spout aperture formed therein at one side of a top of said container; a carrying handle spaced from said spout aperture toward the opposite side of said top and held to said enclosed container by a securing means at an inward portion of said carrying handle; a weighing mechanism comprising a spring and a movable balance handle; guide means for said movable balance handle positioned intermediate said carrying handle and said spout aperture and having a slot formed therein to receive said balance handle; the edges of said slot receiving said inward portion of said carrying handle, said securing means also securing said guide means to said enclosed container; said inward portion of said carrying handle having a hook projection extending into said slot; said spring having a first end hooked to said projection and a second end secured to said balance handle; said slot in said guide means restricting movement of said balance handle to a vertical line when said enclosed container is tilted to receive a load through said spout aperture, whereby the moment of the load striking the bottom of the container and the accumulation of the load in the container maintains the effective center of gravity of the composite in said vertical line through said weighing means.

References Cited in the file of this patent

UNITED STATES PATENTS 1,620,000    Ball _____ Mar. 8, 1927

FOREIGN PATENTS 86,284    Netherlands _____ Sept. 16, 1957